April 30, 1968     P. F. WERSTLEIN     3,380,187
TRAP FOR CATCHING CRABS
Filed June 28, 1965
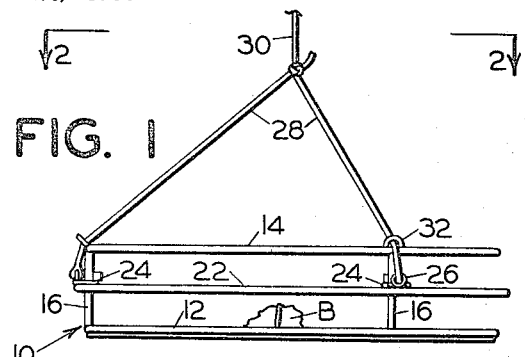
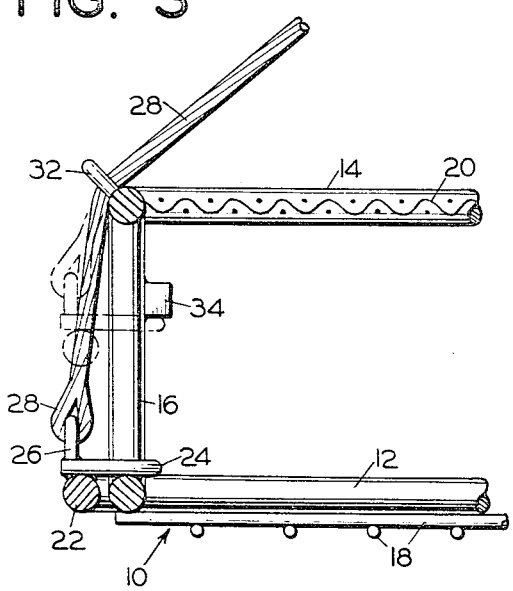
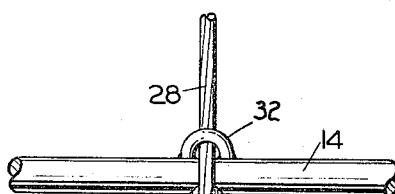
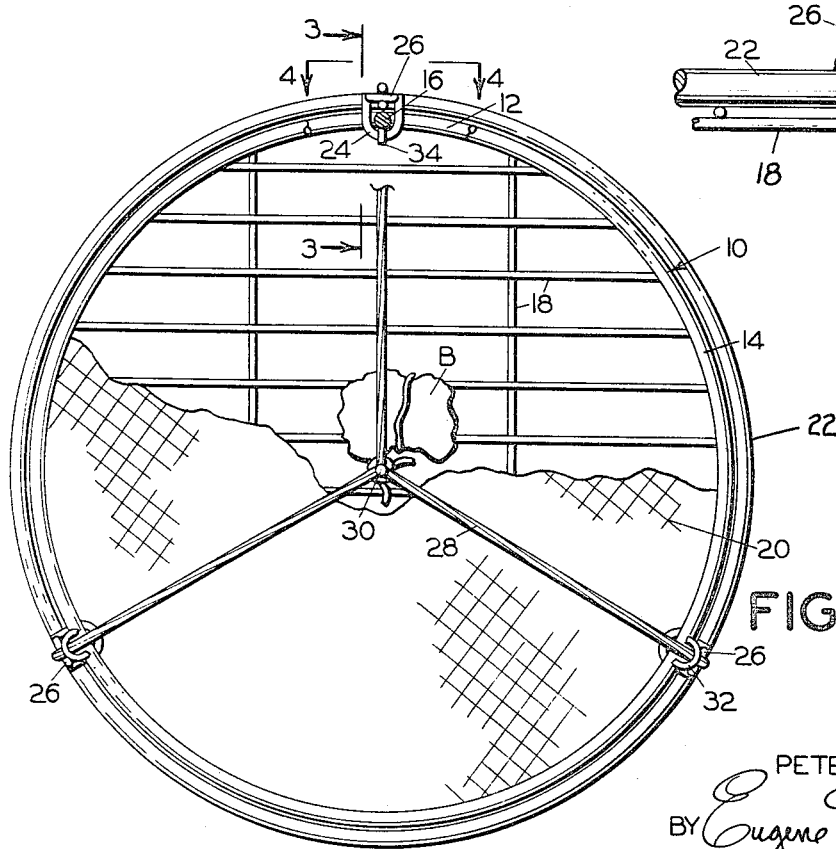
INVENTOR.
PETER F. WERSTLEIN
BY Eugene M. Eckelman
ATTORNEY

United States Patent Office 3,380,187
Patented Apr. 30, 1968

3,380,187
TRAP FOR CATCHING CRABS
Peter F. Werstlein, 1515 SE. Clinton,
Portland, Oreg. 97202
Filed June 28, 1965, Ser. No. 467,482
1 Claim. (Cl. 43—100)

ABSTRACT OF THE DISCLOSURE

The invention includes a housing having upper and lower annular frame members connected in parallel, vertically spaced relation by upright posts. The opening for the trap is around the sides, the top and bottom having a mesh covering to confine crabs in the trap but allowing water to pass therethrough. An outer ring, to which a lifting line is attached, is connected slidably to the upright posts. Stops are provided on the posts to position the ring in trap closing relation when the lifting line is pulled up.

---

This invention relates to new and useful improvements in trap structures for catching crabs.

A primary objective of the present invention is to provide a trap for catching crabs which is simplified in construction and which operates efficiently to trap crabs therein when an upward lifting force is applied to the trap.

A more particular object is to provide a trap of the type described employing a housing having a peripheral side opening through which the crabs may enter and also employing an outer ring which is slidable into the plane of the peripheral side opening when a lifting force is applied to the trap for trapping crabs in the housing.

Another object is to provide a trap for catching crabs constructed and arranged to allow undersize crabs to escape therefrom.

Briefly stated, the present trap employs a housing defined at its top and bottom by mesh walls which permit the passage of water therethrough in order that the trap may be raised and lowered in the water. The sides of the housing are open to allow the crabs to enter, and slidably mounted on the housing is a peripheral closure member arranged to be moved between a lowered position and an intermediate position comprising respectively a position for allowing crabs to enter the trap and a position for trapping them therein. The peripheral closure member is movable from its lowered position to its intermediate position by a lifting line for the trap.

The invention will be better understood and addtional objects will become apparent from the following specification and claim, considered together with the accompanying drawings, wherein the numerals of reference indicate like parts.

In the drawings:

FIGURE 1 is a side elevational view of the present trap in reduced form with relation to the other views, the trap in this view being in closed condition;

FIGURE 2 is a top plan view of the trap with parts thereof broken away;

FIGURE 3 is a fragmentary sectional view taken on the line 3—3 of FIGURE 2 and showing the trap in open condition; and FIGURE 4 is a fragmentary sectional view taken on the line 4—4 of FIGURE 2.

Referring in particular to the drawings, the invention comprises a housing designated generally by the numeral 10, FIGURES 1 and 2. The housing has a lower annular frame member 12 and an upper annular frame member 14. Frame members 12 and 14 are interconnected in parallel, spaced relation by three or more upright frame members or posts 16. Since the only interconnection between the frame members 12 and 14 comprises the upright frame members 16, it is apparent that the peripheral side portion of the housing is open whereby crabs may enter therethrough. The spacing between the frame members 12 and 14 is of selected amount to readily permit the crabs to enter through the side.

The bottom frame member 12 has secured thereto, as by welding, a plurality of spaced, crossed bars 18 of a rigidity to support a load of crabs thereon. The spacing or mesh of the bars 18 is sufficiently large to permit free flow of water therethrough but at the same time sufficiently small to confine market size crabs. The upper frame member 14 also has its interior filled by a mesh structure 20 similarly permitting the free passage of water therethrough but confining movement of market size crabs therethrough. Since the mesh structure 20 does not have to support any weight of the catch, it may merely comprise a lightweight mesh construction such as fencing wire.

An annular closure member 22 forms a part of the trap for confining crabs within the housing at selected times. This closure ring is of slightly larger diameter than the housing and has inwardly extending loops 24 secured thereto which encircle the upright frame members 16. The loops 24 are provided in number and spacing on the closure member 22 for engagement with at least three of the posts 16 to provide a stabilized mounting of the member 22 on the housing. Loops 24 have slidable engagement on the posts 16, and the member 22 is thus free to slide from a lower position to an upper intermediate position to be described.

Secured to the loops 24, or to the closure member 22 itself if desired, are a plurality of upstanding eyes 26, these eyes preferably being three in number as shown in FIGURE 2 and welded or otherwise suitably secured in place. Secured to the eyes 26 are branch ends 28 from a lifting line 30. Since there are preferably three of the eyes 26, a balanced three point lifting connection is applied to the closure member 22.

The upper annular frame 24 has outwardly angled eyes 32 secured thereto through which the branch lines 28 extend for guided relation.

Since the closure member 22 is slidably connected to the upright posts 16 and since it is connected to the lifting line, it will be moved upwardly when an upward force is applied on said lifting line to lift the trap. To close the trap at the sides, the closure member must have a stop position intermediate the frame members 12 and 14. For this purpose, upright posts 16 are provided with integral, inwardly directed stop projections or blocks 34 provided between the ends thereof for engagement by the encircling portion of the loops 24 on the closure member 22. In fact, the projections 34 are located on the posts 16 such that the lower edge thereof is approximately the mid point between the frame members 12 and 14.

In the operation of the present trap, a bait B is tied to the bottom mesh structure 18. The trap is then lowered in the water by letting out lifting line 30. When the trap reaches the floor of the ocean or the like, the lifting line 30 is released an amount sufficient to allow the closure member 22 to fall by gravity to its lower position. With the closure member in such lower position, crabs are free to enter the trap by moving through the open peripheral side portion thereof. When it is desired to empty the trap the line 30 is lifted. As soon as an upward force is applied to the line 30, the closure member 22 is raised upwardly into abutment with the projections 34. Further lifting of the line will raise the trap and keep the closure member in its upper position and prevent market size crabs from escaping. Smaller crabs, however, can escape through perforations through the bottom, top, and sides of the trap.

It is to be understood that the form of my invention herein shown and described is to be taken as a preferred example of the same and that various changes in the shape, size and arrangement of parts may be resorted to without departing from the spirit of my invention or the scope of the subjoined claim.

Having thus described my invention, I claim:

1. A trap for crabs comprising a housing having upper and lower endless frame members connected in parallel vertically spaced relation by spaced upright posts rigidly connected thereto to provide a peripheral side opening of sufficient vertical dimension to permit crabs to move therethrough into the trap, a lifting line for said trap, means enclosing the center portion of said endless frame members so as to permit passage of water therethrough but to confine crabs in the trap, an endless closure member extending around said housing and normally lying by gravity at a lower position adjacent said lower frame member, loop means on said closure member slidably connecting said closure member to said upright posts for vertical movement upward from its lower position into the plane of said side opening, and stop means integrated with said upright posts and disposed in the path of said closure member and located vertically between the upper and lower endless frame members in a selected position such that when said closure member is raised thereagainst the side opening is closed to the egress of crabs from the trap, said lifting line being connected to said closure member whereby to move the latter upwardly against said stop means when the trap is lifted upwardly by an upward lifting force on said lifting line.

References Cited

UNITED STATES PATENTS

| | | | |
|---|---|---|---|
| 690,507 | 1/1902 | Zangenberg | 43—105 |
| 1,447,502 | 3/1923 | Asanio et al. | 43—100 |
| 1,958,724 | 5/1934 | Stanislaw | 43—100 |
| 1,968,758 | 7/1934 | Gatch | 43—105 |
| 2,728,164 | 12/1955 | Mears | 43—105 |
| 3,184,881 | 5/1965 | Jatzeck | 43—102 |

FOREIGN PATENTS

| | | |
|---|---|---|
| 1,280,730 | 11/1961 | France. |
| 146,630 | 8/1954 | Sweden. |

SAMUEL KOREN, *Primary Examiner.*

WARNER H. CAMP, *Examiner.*